US011002551B1

(12) United States Patent
Capasso et al.

(10) Patent No.: US 11,002,551 B1
(45) Date of Patent: May 11, 2021

(54) AIRLINE TRAVEL REMINDER ASSEMBLY

(71) Applicants: Luisa Capasso, Marblehead, MA (US); Tyler Capasso, Marblehead, MA (US)

(72) Inventors: Luisa Capasso, Marblehead, MA (US); Tyler Capasso, Marblehead, MA (US)

(*) Notice: Subject to any disclaimer, the term of this patent is extended or adjusted under 35 U.S.C. 154(b) by 0 days.

(21) Appl. No.: 16/728,699

(22) Filed: Dec. 27, 2019

(51) Int. Cl.
| | | |
|---|---|---|
| *G01C 21/26* | (2006.01) | |
| *G01C 21/00* | (2006.01) | |
| *G01C 21/20* | (2006.01) | |
| G08B 5/22 | (2006.01) | |
| G06Q 30/02 | (2012.01) | |
| G06F 3/147 | (2006.01) | |
| A44C 5/00 | (2006.01) | |

(52) U.S. Cl.
CPC ........... *G01C 21/265* (2013.01); *G01C 21/00* (2013.01); *G01C 21/206* (2013.01); *G01C 21/26* (2013.01); *A44C 5/0015* (2013.01); *G06F 3/147* (2013.01); *G06Q 30/0281* (2013.01); *G08B 5/226* (2013.01)

(58) Field of Classification Search
CPC .... G01C 21/00; G01C 21/005; G01C 21/206; G01C 21/26; G01C 21/265; G01C 21/28; G01C 21/34; G07C 9/28; G06Q 10/06; G06Q 10/047; G06F 3/01; G06F 3/014
See application file for complete search history.

(56) References Cited

U.S. PATENT DOCUMENTS

| | | |
|---|---|---|
| 6,766,039 B1 | 7/2004 | Al-Sheikh |
| 7,204,425 B2 | 4/2007 | Mosher, Jr. |
| 8,654,018 B2 | 2/2014 | Warhter |
| 8,854,925 B1 | 10/2014 | Lee |
| 9,245,175 B1 * | 1/2016 | Vladimir .................. G07C 9/37 |
| D771,037 S | 11/2016 | Akana |
| 2005/0083171 A1 | 4/2005 | Hamilton |
| 2011/0106445 A1 * | 5/2011 | Mayer .................. G06Q 10/047 |
| | | 701/533 |
| 2013/0182382 A1 * | 7/2013 | Vardi ....................... G07C 9/20 |
| | | 361/679.01 |
| 2015/0253885 A1 | 9/2015 | Kagan |
| 2019/0075359 A1 * | 3/2019 | Boss ...................... H04L 67/306 |

FOREIGN PATENT DOCUMENTS

WO     WO9917246     4/1999

* cited by examiner

*Primary Examiner* — Van T Trieu

(57) ABSTRACT

An airline travel reminder assembly for displaying flight information for a traveler includes a wrist band that is issued to a traveler at a check in point of an airport. A display unit is issued to the traveler at the check in point of the airport. The display unit is programmed to contain flight information for the traveler and the display unit is removably coupled to the wrist band when the display unit is programmed. The display unit displays indicia comprising the pertinent flight information for the traveler. Moreover, the display unit is in wireless communication with a communication network in the airport to receive updates to the pertinent flight information.

12 Claims, 5 Drawing Sheets

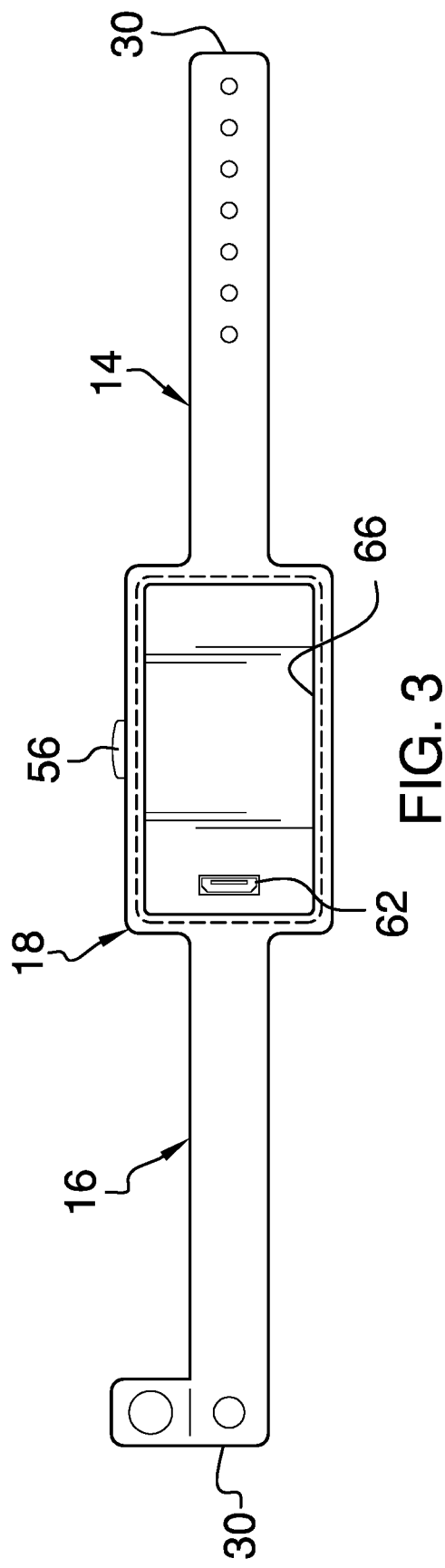

US 11,002,551 B1

AIRLINE TRAVEL REMINDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to reminder devices and more particularly pertains to a new reminder device for displaying fight information for a traveler.

(2) Description of Related Art Including Information Disclosed Under 37 CFR 1.97 and 1.98

The prior art relates to reminder devices. The prior art discloses a wrist band having a printed image thereon for identifying a traveler. Additionally, the prior art discloses a wrist band having biometric sensors for identifying a person wearing the wrist band. The prior art discloses a wrist strap which has an RFID chip integrated therein and a display for displaying identification information stored in the RFID chip. The prior art discloses a smart watch having wireless communication capabilities for displaying remotely received information. Additionally, the prior art discloses a smart watch that is in two way communication with a remote communication network for displaying data received from the remote communication network and sending data to the remote communication network.

BRIEF SUMMARY OF THE INVENTION

An embodiment of the disclosure meets the needs presented above by generally comprising a wrist band that is issued to a traveler at a check in point of an airport. A display unit is issued to the traveler at the check in point of the airport. The display unit is programmed to contain flight information for the traveler and the display unit is removably coupled to the wrist band when the display unit is programmed. The display unit displays indicia comprising the pertinent flight information for the traveler. Moreover, the display unit is in wireless communication with a communication network in the airport to receive updates to the pertinent flight information.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a bottom view of an embodiment of the disclosure.

FIG. 4 is a right side view of an embodiment of the disclosure.

DETAILED DESCRIPTION OF THE INVENTION

Figure 1:
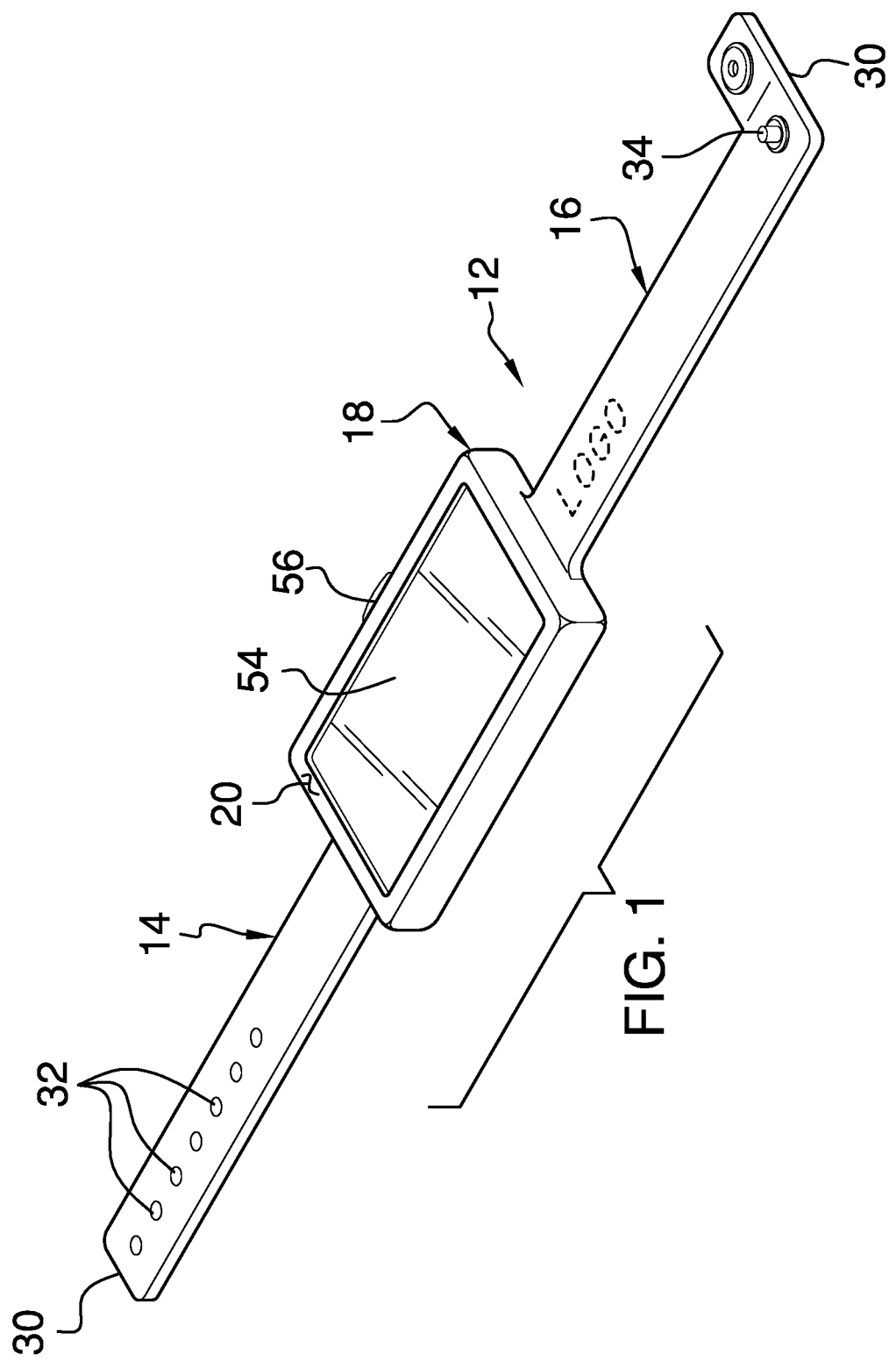
FIG. 1 is a top perspective view of an airline travel reminder assembly according to an embodiment of the disclosure.
Figure 2:
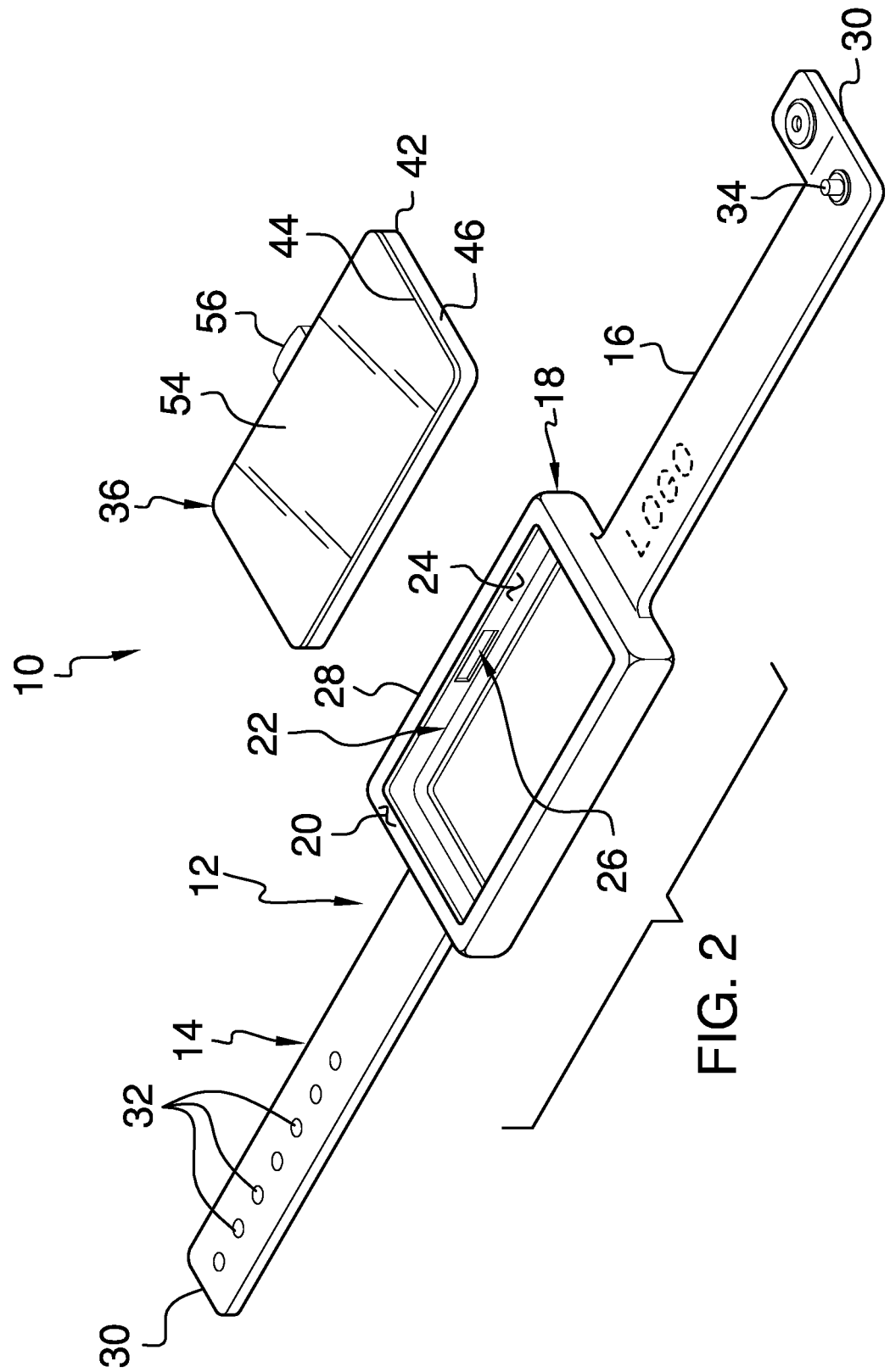
FIG. 2 is an exploded perspective view of an embodiment of the disclosure.
Figure 5:
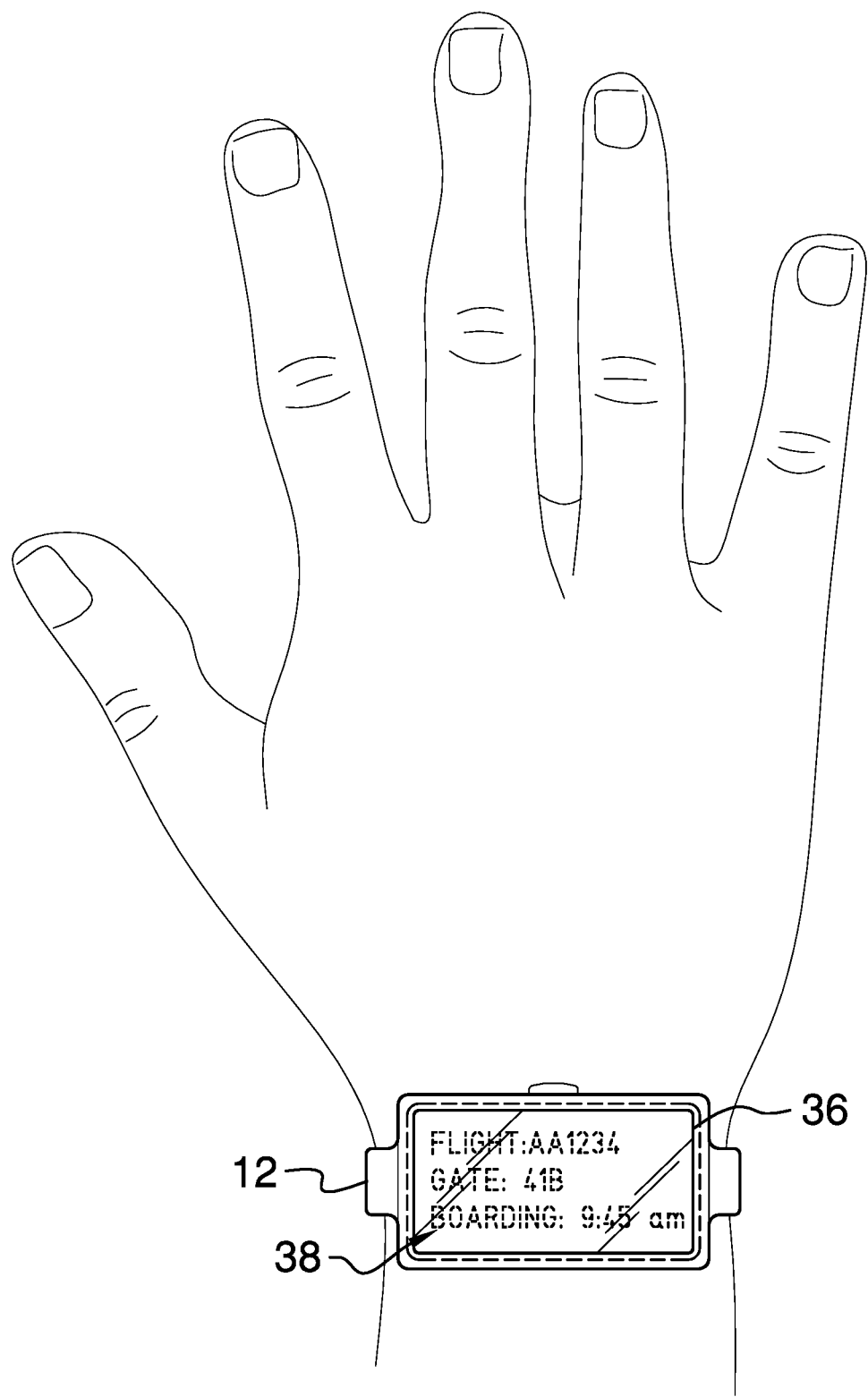
FIG. 5 is a perspective in-use view of an embodiment of the disclosure.
Figure 6:
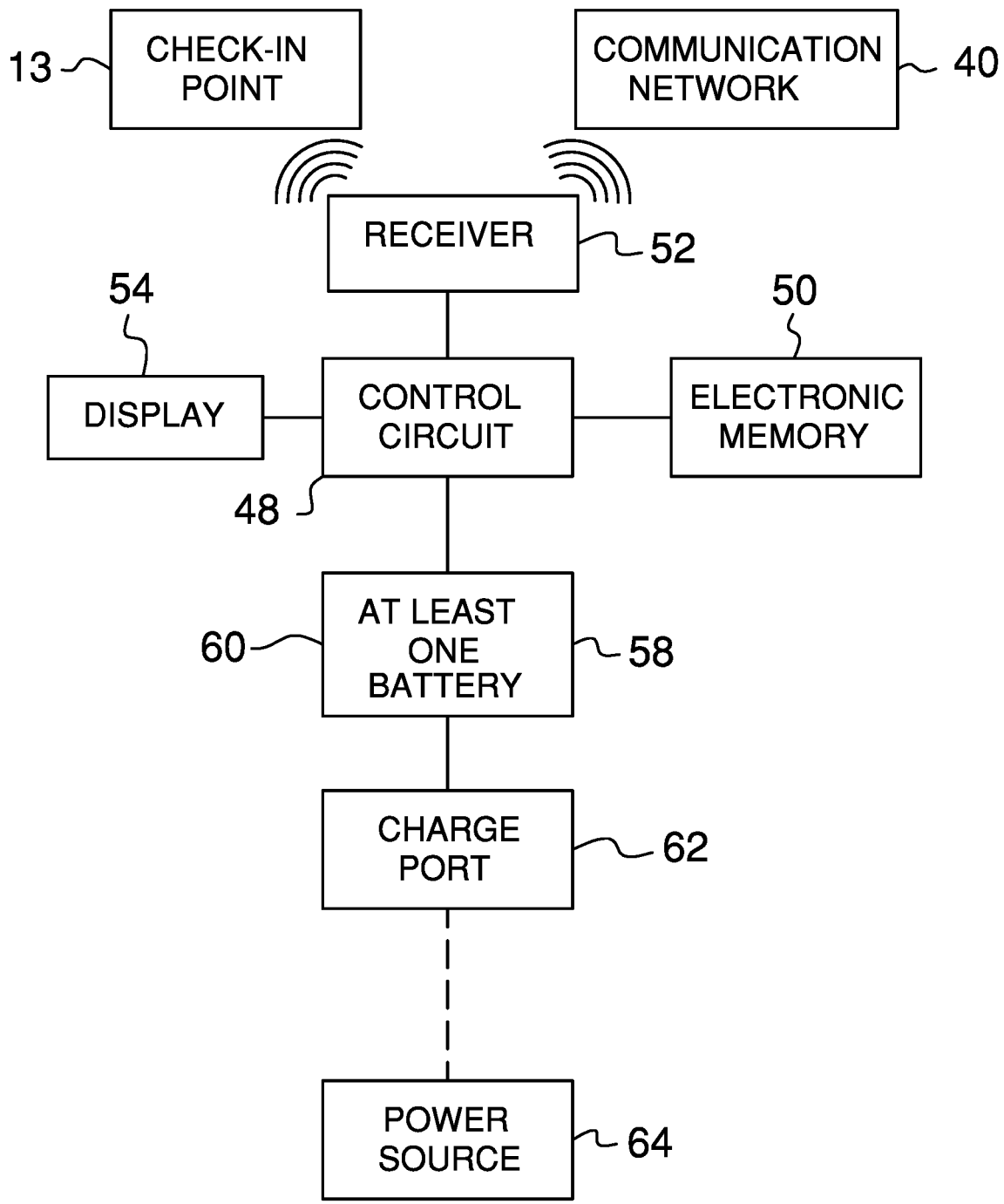
FIG. 6 is a schematic view of an embodiment of the disclosure.

With reference now to the drawings, and in particular to FIGS. 1 through 6 thereof, a new reminder device embodying the principles and concepts of an embodiment of the disclosure and generally designated by the reference numeral 10 will be described.

As best illustrated in FIGS. 1 through 6, the airline travel reminder assembly 10 generally comprises a wrist band 12 that is issued to a traveler at a check in point 13 of an airport. The wrist band 12 has a first strap portion 14, a second strap portion 16 and a central portion 18. The first strap portion 14 is matable to the second strap portion 16 such that the wrist band 12 forms a closed loop. Additionally, the central portion 18 has a width that is greater than the width of the first strap portion 14 or the second strap portion 16. The central portion 18 has a top surface 20, the top surface 20 has a well 22 extending downwardly therein and the well 22 has a bounding surface 24. The wrist band 12 has a button opening 26 extending through the bounding surface 24 and a perimeter surface 28 of the central portion 18.

Each of the first strap portion 14 and the second strap portion 16 has a distal end 30 with respect to the central portion 18. The first strap portion 14 has a plurality of engagement points 32 thereon. The engagement points 32 are spaced apart from each other and are distributed between the distal end 30 of the first strap portion 14 and the central portion 18. The engagement points 32 may comprise a sequence of holes that extends through the first strap portion 14. A fastener 34 is coupled to the second strap portion 16 and the fastener 34 is positioned adjacent to the distal end 30 of the second strap portion 16. The fastener 34 releasably engages a respective one of the engagement points 32 on the first strap portion 14 to form a closed loop of an adjustable diameter. In this way the wrist band 12 can accommodate a variety of wrist sizes. The fastener 34 may comprise a pair of snaps that engage each other, through the respective engagement point, for attaching the second strap portion 16 to the first strap portion 14.

A display unit 36 is provided and the display unit 36 is issued to the traveler at the check in point 13 of the airport. The display unit 36 is programmed, by an airline agent at the check in point 13, to contain flight information for the traveler. The display unit 36 is removably coupled to the wrist band 12 when the display unit 36 is programmed. Additionally, the display unit 36 displays indicia 38 comprising the pertinent flight information for the traveler. Moreover, the display unit 36 is in wireless communication with a communication network 40 in the airport to receive updates to the pertinent flight information. In this way the pertinent flight information is always available to the traveler as well as continually updating the traveler on any changes to the pertinent flight information. The communication network may be a flight information system of the airport that tracks and displays flight information, such as departure times and arrival times.

The display unit 36 comprises a housing 42 that has a top wall 44 and a perimeter wall 46. The housing 42 is removably positioned in the well 22 in the central portion 18 of the wrist band 12 having the top wall 44 being exposed. In this way the top wall 44 is visible to the traveler when the traveler wears the wrist band 12. A control circuit 48 is positioned in the housing 42 and an electronic memory 50 is positioned in the housing 42. The electronic memory 50 is electrically coupled to the control circuit 48 and the electronic memory 50 storing a database comprising the pertinent flight information.

The display unit 36 includes a receiver 52 that is positioned in the housing 42 and the receiver 52 is electrically coupled to the control circuit 48. The receiver 52 is in wireless communication with the check in point 13 of the airport. In this way the airline agent at the check in point 13 can download the pertinent flight information into the electronic memory 50. The receiver 52 is in wireless communication with the communication network 40 in the airport for uploading the updates into the electronic memory 50. The receiver 52 may comprise a radio frequency receiver or the like, and the receiver 52 may employ Bluetooth communication protocols and a WPAN signal.

The display unit 36 includes a display 54 that is coupled to the top wall 44 of the housing 42 and the display 54 is electrically coupled to the control circuit 48. The display 54 displays indicia 38 comprising the pertinent flight information. The display 54 may be an LED or other type of electronic display. A button 56 is movably coupled to the perimeter wall 46 of the housing 42 and the button 56 is electrically coupled to the control circuit 48. The button 56 extends outwardly through the button opening 26 in the wrist band 12 when the housing 42 is inserted into the well 22. The button 56 can be depressed by the traveler and the display 54 cycles through the pertinent flight information as the button 56 is depressed.

The display unit 36 includes a power supply 58 that is positioned in the housing 42 and the power supply 58 is electrically coupled to the control circuit 48. The power supply 58 comprises at least one battery 60 that is positioned in the housing 42 and the at least one battery 60 is electrically coupled to the control circuit 48. The power supply 58 includes a charge port 62 that is recessed into the housing 42 and the charge port 62 is electrically coupled to the at least one battery 60. Additionally, the charge port 62 is pluggable into a power source 64 for charging the at least one battery 60. As is most clearly shown in FIG. 3, the well 22 in the central portion 48 of the wrist band 12 may have an opening 66 extending therethrough such that the housing 42 is accessible through the opening 66.

In use, the pertinent flight information for the traveler is downloaded into the display unit 36 when the traveler checks in for their flight and the display unit 36 is positioned in the wrist band 12. The wrist band 12 and the display unit 36 are issued to the traveler when the pertinent flight information is stored in the display unit 36. The traveler wears the wrist band 12 thereby facilitating the traveler to have constant access to their flight information, as well as being made aware of any changes or updates. The traveler returns the wrist band 12 and the display unit 36 to a pre-determined location when the traveler reaches their final destination on their flight.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. An airline travel reminder assembly being configured to be worn on a traveler and display pertinent flight information for the traveler, said assembly comprising:
    a wrist band being issued to a traveler at a check in point of an airport; and
    a display unit being issued to the traveler at the check in point of the airport, said display unit being programmed to contain flight information for the traveler, said display unit being removably coupled to said wrist band when said display unit is programmed such that said display unit is selectively separable from said wrist band, said display unit displaying indicia comprising the pertinent flight information for the traveler, said display unit being in wireless communication with a communication network in the airport wherein said display unit is configured to receive updates to the pertinent flight information.

2. The assembly according to claim 1, wherein said wrist band has a first strap portion, a second strap portion and a central portion, said first strap portion being matable to said second strap portion such that said wrist band forms a closed loop, said central portion having a width being greater than the width of said first strap portion or said second strap portion.

3. The assembly according to claim 2, wherein said central portion has a top surface, said top surface having a well extending downwardly therein, said well having a bounding surface, said wrist strap having a button opening extending through said bounding surface and a perimeter surface of said central portion.

4. The assembly according to claim 3, wherein each of said first strap portion and said second strap portion has a distal end with respect to said central portion, said first strap portion having a plurality of engagement points thereon, said engagement points being spaced apart from each other and being distributed between said distal end of said first strap portion and said central portion.

5. The assembly according to claim 4, further comprising a fastener being coupled to said second strap portion, said fastener being positioned adjacent to said distal end of said second strap portion, said fastener engaging a respective one of said engagement points on said first strap portion to form a closed loop of an adjustable diameter wherein said wrist band is configured to accommodate a variety of wrist sizes.

6. The assembly according to claim 3, wherein said display unit comprises a housing having a top wall and a perimeter wall, said housing being removably positioned in said well in said central portion of said wrist band having said top wall being exposed wherein said top wall is configured to be visible to the traveler.

7. The assembly according to claim 6, wherein said display unit includes:
a control circuit being positioned in said housing; and
an electronic memory being positioned in said housing, said electronic memory being electrically coupled to said control circuit, said electronic memory storing a database comprising the pertinent flight information.

8. The assembly according to claim 7, wherein said display unit includes a receiver being positioned in said housing, said receiver being electrically coupled to said control circuit, said receiver being in wireless communication with the check in point of the airport thereby facilitating an agent at the check in point to download the pertinent flight information into said electronic memory, said receiver being in wireless communication with the communication network in the airport for uploading the updates into said electronic memory.

9. The assembly according to claim 8, wherein said display unit includes a display being coupled to said top wall of said housing, said display being electrically coupled to said control circuit, said display displaying indicia comprising the pertinent flight information.

10. The assembly according to claim 9, wherein said display unit includes a button being movably coupled to said perimeter wall of said housing, said button being electrically coupled to said control circuit, said button extending outwardly through said button opening in said wrist band when said housing is inserted into said well wherein said button is configured to be depressed by the traveler, said display cycling through the pertinent flight information as said button is depressed.

11. The assembly according to claim 10, wherein said display unit includes a power supply being positioned in said housing, said power supply being electrically coupled to said control circuit, said power supply comprising:

at least one battery being positioned in said housing, said at least one battery being electrically coupled to said control circuit; and
a charge port being recessed into said housing, said charge port being electrically coupled to said at least one battery, said charge port being pluggable into a power source for charging said at least one battery.

12. An airline travel reminder assembly being configured to be worn on a traveler and display pertinent flight information for the traveler, said assembly comprising:
a wrist band being issued to a traveler at a check in point of an airport, said wrist band having a first strap portion, a second strap portion and a central portion, said first strap portion being matable to said second strap portion such that said wrist band forms a closed loop, said central portion having a width being greater than the width of said first strap portion or said second strap portion, said central portion having a top surface, said top surface having a well extending downwardly therein, said well having a bounding surface, said wrist strap having a button opening extending through said bounding surface and a perimeter surface of said central portion, each of said first strap portion and said second strap portion having a distal end with respect to said central portion, said first strap portion having a plurality of engagement points thereon, said engagement points being spaced apart from each other and being distributed between said distal end of said first strap portion and said central portion;
a fastener being coupled to said second strap portion, said fastener being positioned adjacent to said distal end of said second strap portion, said fastener engaging a respective one of said engagement points on said first strap portion to form a closed loop of an adjustable diameter wherein said wrist band is configured to accommodate a variety of wrist sizes; and
a display unit being issued to the traveler at the check in point of the airport, said display unit being programmed to contain flight information for the traveler, said display unit being removably coupled to said wrist band when said display unit is programmed such that said display unit is selectively separable from said wrist band, said display unit displaying indicia comprising the pertinent flight information for the traveler, said display unit being in wireless communication with a communication network in the airport wherein said display unit is configured to receive updates to the pertinent flight information, said display unit comprising:
a housing having a top wall and a perimeter wall, said housing being removably positioned in said well in said central portion of said wrist band having said top wall being exposed wherein said top wall is configured to be visible to the traveler;
a control circuit being positioned in said housing;
an electronic memory being positioned in said housing, said electronic memory being electrically coupled to said control circuit, said electronic memory storing a database comprising the pertinent flight information;
a receiver being positioned in said housing, said receiver being electrically coupled to said control circuit, said receiver being in wireless communication with the check in point of the airport thereby facilitating an agent at the check in point to download the pertinent flight information into said electronic memory, said receiver being in wireless communication with the communication network in the airport for uploading the updates into said electronic memory;

a display being coupled to said top wall of said housing, said display being electrically coupled to said control circuit, said display displaying indicia comprising the pertinent flight information;

a button being movably coupled to said perimeter wall of said housing, said button being electrically coupled to said control circuit, said button extending outwardly through said button opening in said wrist band when said housing is inserted into said well wherein said button is configured to be depressed by the traveler, said display cycling through the pertinent flight information as said button is depressed; and a power supply being positioned in said housing, said power supply being electrically coupled to said control circuit, said power supply comprising:

at least one battery being positioned in said housing, said at least one battery being electrically coupled to said control circuit; and a charge port being recessed into said housing, said charge port being electrically coupled to said at least one battery, said charge port being pluggable into a power source for charging said at least one battery.

* * * * *